Oct. 20, 1925.
W. E. JOHNSTON
1,558,093
AUTOMATIC SHUT-OFF VALVE
Filed Nov. 21, 1924
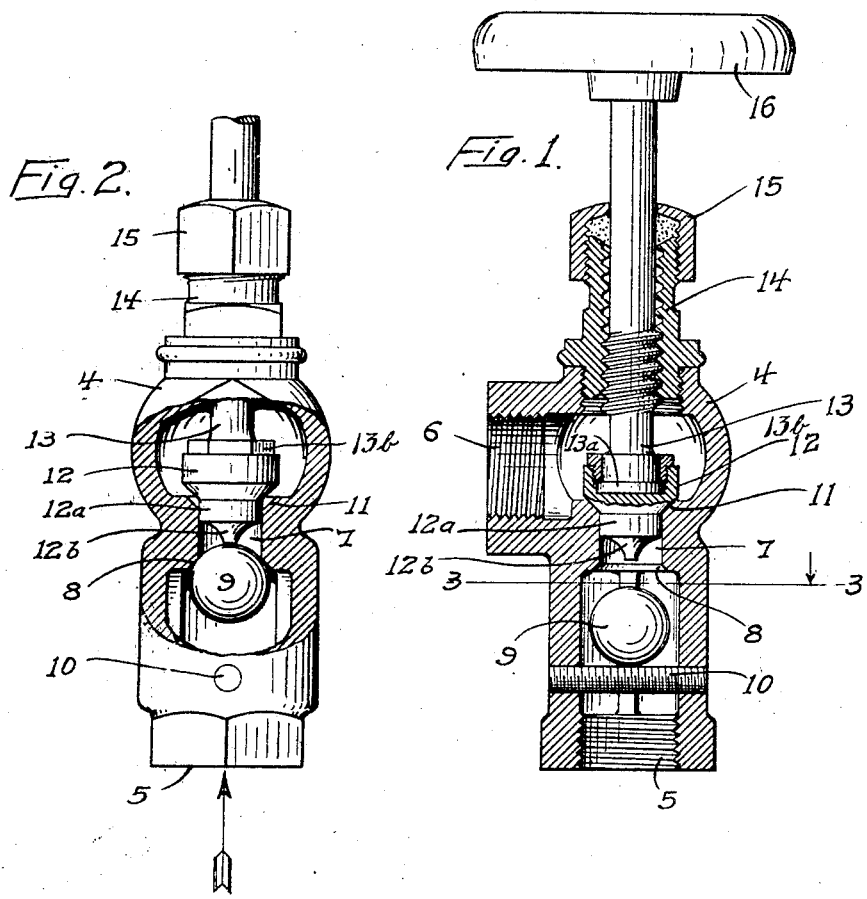
INVENTOR
WAYBURN E. JOHNSTON
BY HIS ATTORNEY
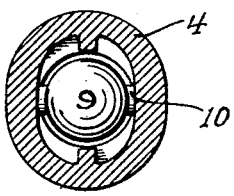

Patented Oct. 20, 1925.

1,558,093

UNITED STATES PATENT OFFICE.

WAYBURN E. JOHNSTON, OF MINNEAPOLIS, MINNESOTA.

AUTOMATIC SHUT-OFF VALVE.

Application filed November 21, 1924. Serial No. 751,283.

*To all whom it may concern:*

Be it known that I, WAYBURN E. JOHNSTON, a citizen of the United States, residing at Minneapolis, in the county of Hennepin and State of Minnesota, have invented certain new and useful Improvements in an Automatic Shut-Off Valve; and I do hereby declare the following to be a full, clear, and exact description of the invention, such as will enable others skilled in the art to which it appertains to make and use the same.

This invention relates to a valve and particularly to an automatic shut-off valve used for fluids. While the valve can be used with various fluids, one particular use thereof is on fuel oil lines. Such automatic valves have a passage for the fluid and a check valve usually in the shape of a ball, at one side of this passage. When an excessive flow of oil occurs the check valve or ball is moved against its seat and thus closes the passage and the flow of oil. At the other side of the passage a manually movable valve of the ordinary type is arranged to close the passage. It has been proposed to have a projection extending from this latter valve through the passage so that when the latter valve is closed the projection would engage the check valve or ball when in contact with its seat and move the check valve or ball from its seat. With such an arrangement, however, it is possible to close the manually operated valve sufficiently to have the ball pushed from its seat by said projection and yet still have the manually operated valve open. With such an arrangement, a workman could manipulate the valve so that the automatic closing feature was rendered inoperative and the valve still be open. This operation of the valve by workmen has been quite common in many places and was one great objection to such automatic valve and prevented such a valve from being approved by the underwriters.

It is an object of this invention to provide an automatic shut-off valve which will close upon an excessive flow of fluid, which can be positively closed manually and one which cannot be placed in a position with the automatic valve rendered inoperative.

It is a further object of the invention to provide such a valve having a fluid passage with the check valve in one side adapted to close upon excessive flow of the fluid and having a manually operated valve at the other side of said passage, which valve has means thereon arranged to fit and move into said passage as the latter valve approaches its seat, which means also carries means projecting through the passage to engage the check valve and push the latter from its seat.

It is more specifically an object of the invention to provide such a valve comprising a member having a passage therethrough having a valve seat at one side adapted to be engaged by a ball upon excessive flow of the fluid, said passage having a valve seat at its other side adapted to be engaged by a manually and positively movable valve, which latter valve has a cylindrical plug projecting therefrom arranged to fit and move into the said passage as the latter valve approaches its seat, which plug has a projection adapted to extend through the passage and push the ball from its seat.

These and other objects and advantages of the invention will be fully set forth in the following description made in connection with the accompanying drawings in which like reference characters refer to the same parts throughout the different views, and in which, Fig. 1 is a view in central vertical section of the valve;

Fig. 2 is a partial view of the valve partly in side elevation and partly in central vertical section, said view being taken at right angles to that in Fig. 1; and Fig. 3 is a horizontal section taken on the line 3—3 of Fig. 1, as indicated by the arrow.

Referring to the drawings, a valve is shown comprising a valve body 4 having an interiorly threaded portion 5 adapted to be connected to the inlet conduit or pipe and an interiorly threaded portion 6 adapted to be connected to the outlet conduit or pipe. A passage 7 is formed in the body 4 and while this passage may be of any desired shape in cross section, in the embodiment of the invention illustrated it is shown as of circular shape in cross section. At the inlet side of the passage 7 is a valve seat 8 and a ball 9 is carried in the somewhat enlarged chamber of the body 4 below said seat, said ball normally being supported on a member 10 extending transversely of said chamber and which, in the embodiment of the invention illustrated, is shown as a cylindrical screw. The ball 9 is adapted to engage the seat 8 at certain times and thus close the passage 7. At the upper side of passage 7 is formed a valve seat 11 adapted to be engaged by the frusto-conical or beveled surface of a valve 12. This valve 12 has a floating or swiveled connection to a valve stem 13 threaded, as usual, into a valve head 14 screwed into the body 4 and extending through the stuffing cap 15 threaded onto the head 14, said stem carrying an operating hand wheel 16 at its upper end. While the stem 13 may be connected to the valve 12 in any common and well known manner to provide the swivelled connection in the embodiment of the invention illustrated, the stem is shown as having a flanged head 13$^a$ thereon of larger diameter than the main portion of the stem. The valve 12 is formed with a chamber, the bottom of which substantially fits the member 13$^a$ and a flanged bushing 13$^b$ is threaded into valve 12 against the flange on said head, thus forming a floating or swiveled connection. The particular type of connection between the valve and stem illustrated may be varied, as such specific connection forms no part of the present invention. The valve 12 has projecting from its lower side a cylindrical plug 12$^a$ which is formed to closely fit the passage 7 and forms a closing means therefor, and the plug 12$^a$ has a projection 12$^b$ extending downwardly and centrally therefrom forming means to engage the ball 9 when the same is in contact with its seat.

In operation, when fluid is passing through the valve in a normal manner the valve 12 will be raised above its seat with the plug 12$^a$ and 12$^b$ entirely above the valve seat 11. It will be noted that the chamber containing ball 9 is somewhat enlarged so that a free and unrestricted passage of the fluid is permitted. If there should be an excessive flow of fluid due to a break in the line beyond the valve or from some other cause, the ball 9 will be carried along by the fluid and pushed against its seat 8. This will thus automatically shut off the flow of fluid or oil. If it should be attempted to set the valve in position with the ball 9 pushed from its seat, the plug 12$^a$ will enter the passage 7 and close the same so that no matter if valve 12 is slightly open, as shown in Fig. 2, passage 7 will be closed by a plug 12$^a$. It is impossible therefore to set the valve with the ball 9 held from its seat and the valve 12 open and still have the passage 7 open. In order to open the passage 7 it is necessary to withdraw the plug 12$^a$ therefrom and if this is done, the ball 9 is free to be moved against its seat 8 by an excessive flow of oil so that the automatic feature is always preserved.

When the plug 12$^a$ fits the passage 7, the projection 12$^b$ is not absolutely necessary. When the valve 12 is moved toward closing position and the plug 12$^a$ enters the passage 7 with ball 9 in closed position, the plug presses on the column of oil in the passage 7 above the ball 9 and the ball is thus forced from its seat by this oil before being contacted by projection 12$^b$. If the plug 12$^a$, however, does not fit fairly closely in passage 7 the projection 12$^b$ is necessary.

From the above description it is seen that applicant has provided a very simple and efficient automatic shut-off valve. The valve includes both the positive closing means and the automatic shut-off means and, as above set forth, cannot be placed in position with the automatic shut-off rendered inoperative. The valve can be made practically as cheaply as the objectionable valves of the prior art. The device has been amply demonstrated in actual practice and has gone into commercial use and has been given great approval.

It will, of course, be understood, that various changes may be made in the form, details, arrangement and proportion of the parts without departing from the scope of applicant's invention, which, generally stated, consists in a device capable of carrying out the objects above set forth, such as shown and described and defined in the appended claims.

What is claimed is:

1. An automatic shut-off valve for fluid comprising a body having a fluid passage therethrough, a check valve at one side of said passage adapted to seat on an excessive flow of fluid, and a manually movable valve at the other side of said passage adapted to close said passage, said valve having means thereon fitting said passage substantially to close the same, and means carried by said first mentioned means extending through said passage for engaging said check valve when closed to open the same before said second mentioned valve seats.

2. An automatic shut-off valve for fluid comprising a body having a fluid passage therethrough, a valve seat at one side of said passage, a ball at said side adapted to engage said seat upon an excessive flow of fluid, a valve seat at the other side of said passage, a valve adapted to be manually moved against said latter seat, said valve having a projection thereon fitting and adapted to extend into said passage substantially to close the same, said projection having a further projection thereon adapted to contact said ball when engaged with said first mentioned valve seat and push the same from its seat before said valve engages its seat.

3. An automatic shut-off valve for oil or other fluid comprising a member having a cylindrical passage therethrough, a valve seat at one side of said passage, a chamber adjacent said valve seat, a ball loosely mounted in said chamber and adapted to move against said valve seat and close said passage upon excessive flow of oil, a valve seat at the other side of said passage, a floating valve manually movable against said latter seat, said latter valve having a cylindrical plug projecting therefrom adapted to fit and extend into said passage and said plug having a projection extending therefrom adapted to project through said passage and engage said ball when the latter is in contact with its seat.

4. An automatic shut-off valve for fluid comprising a body having a fluid passage therethrough, a check valve at one side of said passage adapted to seat on an excessive flow of fluid, and a manually movable valve at the other side of said passage adapted to close said passage, said valve having means thereon fitting said passage substantially to close the same, whereby when said means enters said passage with the check valve closed, the latter will be forced open by the pressure of fluid in said passage.

In testimony whereof I affix my signature.

WAYBURN E. JOHNSTON.